June 22, 1926.
J. C. HOWARD
SPEED REDUCING DEVICE FOR PUMPS
Filed Feb. 14, 1923
1,590,166
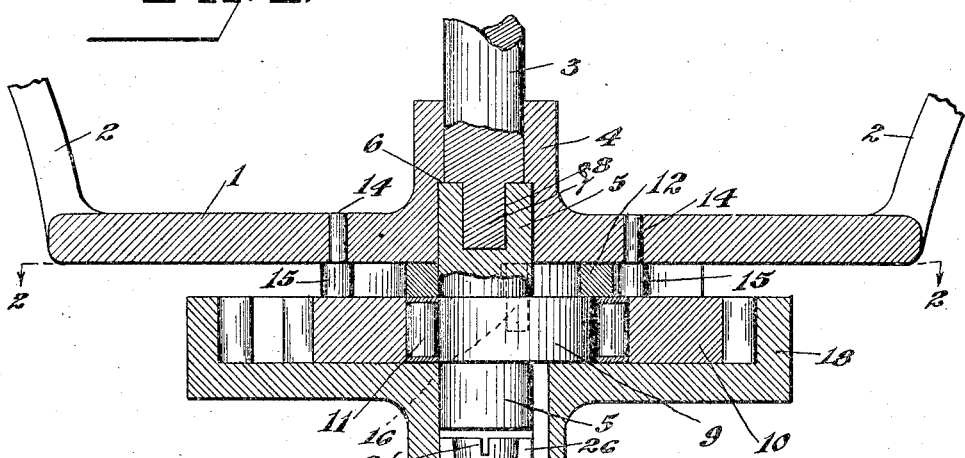
Fig. 1.
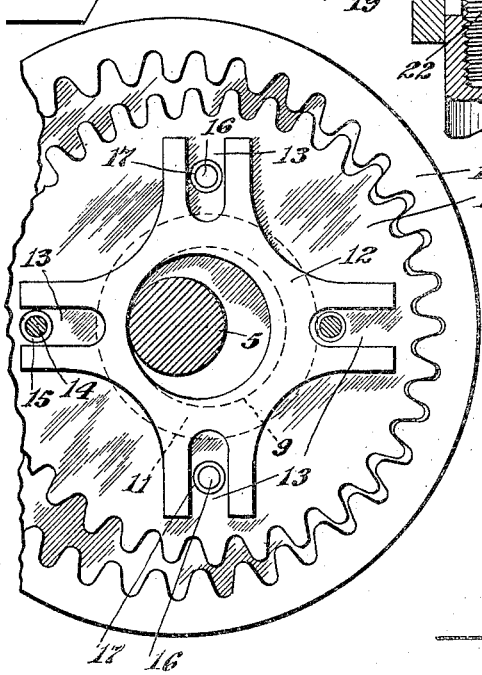
Fig. 2.
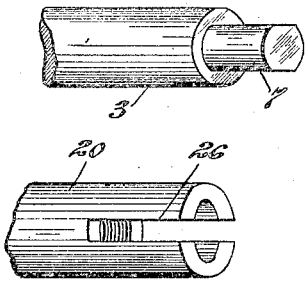
Fig. 3.
Fig. 4.
Jesse C. Howard, Inventor
By Staley & Borman, Attorneys Patented June 22, 1926.

1,590,166

UNITED STATES PATENT OFFICE.

JESSE C. HOWARD, OF COLUMBUS, OHIO.

SPEED-REDUCING DEVICE FOR PUMPS.

Application filed February 14, 1923. Serial No. 618,899.

My invention relates to speed reducing devices particularly adapted to reduce the speed between an electric motor and a pump.

The object of my invention is to devise a mechanism of this character of a simple and effective nature which may be readily assembled and dismantled.

A further object of the invention is to provide simple and effective means for connecting the motor and pump shafts with the speed reducing mechanism.

In the accompanying drawings:

Fig. 1 is a transverse section of a mechanism embodying my improvements.

Fig. 2 is a section on the line 2—2 of Fig. 1.

Fig. 3 is a perspective view of the end of the driving shaft.

Fig. 4 is a perspective view of the end of the driven or pump shaft.

Referring to the drawings, 1 represents a support which is connected by the arms 2 to the motor casing or other suitable point of attachment. The motor shaft 3 is journaled in a bearing 4 on this support as is likewise one end of a cam shaft 5, the bore of the bearing 4 being formed with a shoulder 6 to form a thrust surface for the cam shaft and hold it against endwise movement in one direction. The motor shaft 3 is formed with a tongue 7 and the cam shaft with a groove 8 to receive this tongue to form a driving connection between the two shafts. The cam 9 is surrounded by a spur gear 10 with roller bearings 11 preferably interposed between the parts. A disk 12 has four radial, equally spaced slots 13 into two opposite ones of which project pins 14 carried by the support 1 and having anti-friction rollers 15 and into the other two slots project pins 16 carried by the gear 10 and having anti-friction rollers 17. Surrounding the gear 10 is a gear 18 provided with internal gear teeth. This gear 18 is provided with an extended hub portion 19 which forms a bearing for the other end of the cam shaft 5. The hub of the gear is journaled and supported in a casing member (not shown) which depends from the support 1.

The pump shaft 20 is conected to this extended hub in the following manner: The end of the pump shaft which projects into the hub has a threaded bore 21 into which screws a plug 22, the head 23 of which is formed on an incline. The hub is formed with a slot 23 for the reception of a screw driver or other tool. The hub 19 has a keyway 24 to receive a key 25 and the end of the shaft 20 is also slotted as indicated at 26 to receive the key. The connection between the hub of the gear 18 and the shaft 20 is made before the parts are assembled, the key 25 being inserted in the keyway 24 and the slot 26 and the plug 22 then screwed into the threaded bore of the shaft 20 to cause its head to impinge upon the key, thus firmly connecting parts together.

This connection, it will be seen, is such as to permit the pump shaft to be secured at different points in the hub so as to leave the necessary space therein for the journalling of the cam shaft. After the pump shaft has been secured, the cam and its shaft, the gear 10 and disk 12 may be inserted.

Rotation of the motor shaft 3 rotates the cam 19 and causes the gear 10 aided by the member 12 to intermittently engage the teeth of the gear 18 in a well known way.

Having thus described my invention, I claim:

The combination of a stationary support, a thrust bearing formed in said support, a motor shaft, a cam shaft having a cam engaging said thrust bearing, said cam shaft being suspended from the motor shaft free from any other rigid connections, a reducing mechanism operated by said cam, a pump shaft, and means for securing said pump shaft to one member of said reducing mechanism.

In testimony whereof, I have hereunto set my hand this 9th day of February, 1923.

JESSE C. HOWARD.